(12) United States Patent
Coffin, III et al.

(10) Patent No.: US 6,983,408 B2
(45) Date of Patent: Jan. 3, 2006

(54) MANAGING ERROR/STATUS INFORMATION GENERATED DURING VIDEO PROCESSING

(75) Inventors: Louis F. Coffin, III, Mountain View, CA (US); Deepak Prakash, Fremont, CA (US); James A. Lundblad, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/093,646

(22) Filed: Mar. 8, 2002

(65) Prior Publication Data

US 2003/0172326 A1 Sep. 11, 2003

(51) Int. Cl.
*G06F 11/273* (2006.01)

(52) U.S. Cl. .......................... 714/746; 714/48; 725/151
(58) Field of Classification Search .................. 714/34, 714/725
See application file for complete search history.

(56) References Cited

U.S. PATENT DOCUMENTS

| | | | | |
|---|---|---|---|---|
| 5,153,884 A | * | 10/1992 | Lucak et al. ................. | 714/748 |
| 5,475,754 A | * | 12/1995 | Bridgewater et al. ........ | 380/212 |
| 5,493,562 A | * | 2/1996 | Lo .............................. | 370/252 |
| 5,579,317 A | * | 11/1996 | Pang et al. .................. | 370/392 |
| 5,646,675 A | * | 7/1997 | Copriviza et al. ............ | 725/22 |
| 5,742,623 A | * | 4/1998 | Nuber et al. ................. | 714/798 |
| 5,948,082 A | * | 9/1999 | Ichikawa ...................... | 710/52 |
| 6,026,506 A | * | 2/2000 | Anderson et al. ........... | 714/746 |
| 6,538,656 B1 | * | 3/2003 | Cheung et al. ............. | 345/519 |
| 6,662,329 B1 | * | 12/2003 | Foster et al. ................ | 714/747 |
| 6,684,360 B1 | * | 1/2004 | Ito et al. ..................... | 714/752 |
| 2003/0014705 A1 | * | 1/2003 | Suzuki et al. ............... | 714/748 |
| 2003/0043749 A1 | * | 3/2003 | Tanaka et al. .............. | 370/241 |

* cited by examiner

*Primary Examiner*—Robert Beausoliel
*Assistant Examiner*—Philip Guyton
(74) *Attorney, Agent, or Firm*—Workman Nydegger

(57) ABSTRACT

A method and apparatus for managing error/status information generated in the demultiplexing, processing, and handling of data packets from a video transport stream. Error/status information is organized into control fields of error/status packets. The error/status packets are sent to dedicated error/status buffers of bulk system memory where they can be accessed by a system processor during the reconfiguration and decoding of video programming.

32 Claims, 6 Drawing Sheets

US 6,983,408 B2

MANAGING ERROR/STATUS INFORMATION GENERATED DURING VIDEO PROCESSING

BACKGROUND OF THE INVENTION

1. The Field of the Invention

The present invention relates to methods and apparatus for processing incoming video streams, and more particularly, to methods and apparatus for managing error information generated during demultiplexing processing operations.

2. Background and Related Art

Recent advances in the field of digital video have enhanced capabilities related to the remote access of video programming. Digital video programming is relayed to users via video transport streams. To create a transport stream, multiple digital video programs are encoded in a digital video format and multiplexed into a single transport stream. The stream is then received by a user system. By demultiplexing and decoding the video data in the transport stream, user systems are able to configure and display digital video programming to users.

When a transport stream is received into a user system, a transport stream processor acquires video program data from the incoming transport stream. The video program data is processed by the transport stream processor and sent to a system processor to be configured into a video program for display on a television or another display device.

One of the complexities of processing digital video data is dealing with error or status information that must be utilized by the system processor to configure the data into displayable video programming. Error or status information refers not only to error condition information, but also other types of exception information monitored during demultiplexing. This exception information is referred to hereinafter as error/status information. The error/status information informs the system processor of specialized handling related to processed video data. Examples of error/status information include, buffer management information, picture header address information, packet acquisition information, demultiplexing processing information, memory handling information, continuity counter error information, and program clock reference error information.

Error/status data is generated by the transport stream processor during the acquisition, processing, and memory handling of incoming video data. Incoming video data is delivered to a transport stream processor by a transport stream in a series of data packets. The exact configurations of the data packets are defined by the digital video format used to encode the video programming. Two of the most common formats are digital video broadcasting (DVB), which is based on the Moving Pictures Expert Group-2 (MPEG-2) standard, and digital satellite system (DSS) developed by DIRECTV. DVB has 188-byte packets while DSS has 130-byte packets. The packets of the transport stream include a payload in which the digital video data is encoded and a header that includes an identifier so that the transport stream processor can select packets that correspond to a desired program. In DVB, the identifier is called a packet identifier (PID), while in DSS, the identifier is called a service channel identifier (SCID). Each PID/SCID operates to identify packets of the given type.

There can be approximately 20 to 40 different PIDS/SCIDS within a transport stream, which typically includes multiple programs, each being represented by one or more PIDS/SCIDS. For example, a program may have one PID representing all audio packets, a different PID representing all video packets, and another PID representing packets containing processing information. Transport processing includes demultiplexing the packets so as to obtain the packets associated with a desired program and assembling the packets in such a way that a video decompressor can configure the data into a digital video program.

During the acquisition and processing of data packets, the transport stream processor generates error/status information related to the acquisition, processing, and memory handling of the data packets. The exact nature of the error/status information generated by the transport stream processor is defined by the digital video format used. Error/status information may be generated for any type of information that the system wants to obtain from the incoming transport stream.

FIG. 1 illustrates a conventional transport stream processor 10 in which error information is generated. The transport stream processor includes a PID filter 22, a descrambler 24, a processor 26, memory (code space ROM/RAM) 28, and a direct memory access (DMA) engine 30. Also illustrated are a transport source 20, a first video stream buffer 34, a second video stream buffer 36, and a host communication 38.

Data packets in the transport stream are sent to transport stream processor 10 from transport source 20 through PID filter 22. Transport source 20 can be any of a variety of sources for video streams, including but not limited to, a digital satellite system, digital cable, or other sources for incoming video streams. PID filter 22 identifies data packets in the incoming video stream having PIDs/SCIDs associated with the video program to be acquired. Processor 26 programs PID filter 22 to dilineate PIDs/SCIDs to be acquired. Utilizing the parameters set by processor 26, PID filter 22 acquires the data packets having the desired packet information. Once the packets are acquired they are sent to descrambler 24. Descrambler 24 performs descrambling operations on the acquired data packets where descrambling operations are required for the processing of the data packets. As with PID filter 22, processor 26 informs the descrambling operations to be performed by descrambler 24.

Once the packets have been acquired and optionally descrambled, they are sent to processor 26. Processor 26 includes a demultiplexing processor. The demultiplexing processor performs processing operations on the acquired data packets, such as removing unneeded header information, to prepare the data to be displayed as video programming. The demultiplexing processor also identifies error/status conditions encountered in the processing of the data packets. Error/status information is generated in response to a condition associated with the data processing that causes an exception or interrupt to be asserted. For example, where the transport stream processor 10 encounters an error during PID filtering, descrambling, or other demultiplexing processing operations, the processor generates error information so the system processor can properly process data packets causing such error conditions.

Once the error/status information has been generated by processor 26, the information is sent to transport processor memory 28 for storage. Transport processor memory 28 typically comprises nonvolatile memory such as ROM. As previously mentioned, one function of the transport processor memory 28 is to provide code space for instructions defining demultiplexing processing operations to be performed by processor 10. Transport processor memory 28 also functions as the memory receptacle for all error/status information.

Once the incoming data packets have been filtered, descrambled, and processed, they are transported to DMA engine 30. Because packets in the transport stream are not necessarily sequentially ordered, DMA engine 30 transmits packets into list 32 contained in transport processor memory 28. List 32 allows the packets to be sequenced appropriately for video decoding and image rendering operations performed in preparation for displaying the video data to the viewer. Once the packets have been arranged sequentially, they are then sent as DMA out to system buffers 34 and 36.

System buffers contain a finite amount of memory space. Accordingly, once a buffer is filled with the requisite amount of data, it can accept no additional data. To ensure that processed digital video data is sent to system memory in a continuous fashion, DMA engine 30 employs system buffers adapted to handle the continuous relay of data packets. For example, in the illustrated embodiment two ping pong buffers are utilized, first video stream buffer 34 and second video stream buffer 36. Initially, DMA engine 30 designates the first video stream buffer 34 as "current." And the second video stream buffer 36 as "next." DMA engine 30 sends processed data packets and the associated video data to first video stream buffer 34, as it is currently designated as the "current" buffer. As the current buffer is filled, DMA engine 30 the first video stream buffer 34 and second video stream buffer 36 are alternatively designated as the current and next buffer. The buffers receive the processed data packets and the associated video data, thereby enabling the DMA engine to transmit the processed data packets in a continuous fashion.

Processed video data from the processed data packets held in "current" and "next" video stream buffers are then accessed by a system processor (not shown). The system processor reconfigures the processed video data into digital video programming that can be decoded and displayed on a display device. As the system processor accesses and reconfigures the video data from the processed data packets, the processor simultaneously accesses error/status information from the transport stream processor memory 28 to inform the reconfiguration and decoding operations. For example, if the video data of a given data packet requires specialized handling, the error/status information informs the system processor of the need for such specialized handling. Additional detail regarding error/status information and its role in transport processing is described hereinafter.

One of the limitations of the management of error/status information relates to the fact that the system processor must access the error information from transport stream processor memory 28. The error information is accessed through host communication 38. While video data associated with the processed data packets is accessed by the system processor at extremely high rates (i.e. microseconds), the system processor requires substantially more time to access error/status information from the transport stream processor memory 28 (i.e. milliseconds). The time differential limits the ability of the system processor to efficiently utilize error/status information in the reconfiguration of the video data associated with processed data packets. These limitations become more pronounced where burdens on the system processor are the greatest. For example, during the fast-forward and rewind functionality provided by many digital video formats, the system processor must quickly and efficiently access error/status information. Where the system processor is required to receive and decode multiple video programs, the burdens placed on the system processor are similarly pronounced.

In view of the above, it is apparent that there is a need for new and improved methods and apparatus for managing error information generated during the processing of video transport stream data. It is desirable that the methods increase the efficiency with which system processor may access and utilize such error information.

BRIEF SUMMARY OF THE INVENTION

The present invention relates to methods and apparatus for processing incoming video streams, and more particularly, to methods and apparatus for managing error/status information generated during demultiplexing processing operations. Error/status packets having control fields for holding error information and packet handling information are used according to the invention to manage the error/status information. During the demultiplexing and transport processing of data packets, error/status information is generated by the transport processor. The error/status information is organized into the control fields of the error/status packets.

The error/status packets are stored in dedicated error/status buffers of bulk system memory. During the processing and decoding of video programming, the system processor accesses the error/status packets. This informs the system processor of exception states requiring specialized handling of the video data associated with processed data packets.

The use of error/status packets to manage error/status information allows error information to be stored in bulk system memory rather than in the transport processor memory. Not only does this streamline processing and transfer of packet data and error/status information, but it also reduces the cost and the complexity of the transport processor. Additionally, the system processor benefits from being able to quickly and efficiently access error/status information associated with the processing of a given video program.

According to one implementation of the invention, error/status packets are generated in a transport processing apparatus having multiple transport processor units configured to process a plurality of video programs from a plurality of incoming video transport streams. In this case, each of the multiple transport processor units of the transport processing apparatus can utilize a shared bulk system memory in which the error/status packets are stored without requiring each of the transport processor units to store error information in a dedicated transport processor memory. In another implementation, error/status packets are generated in a transport processing apparatus configured to process a single video program from an incoming video transport stream.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
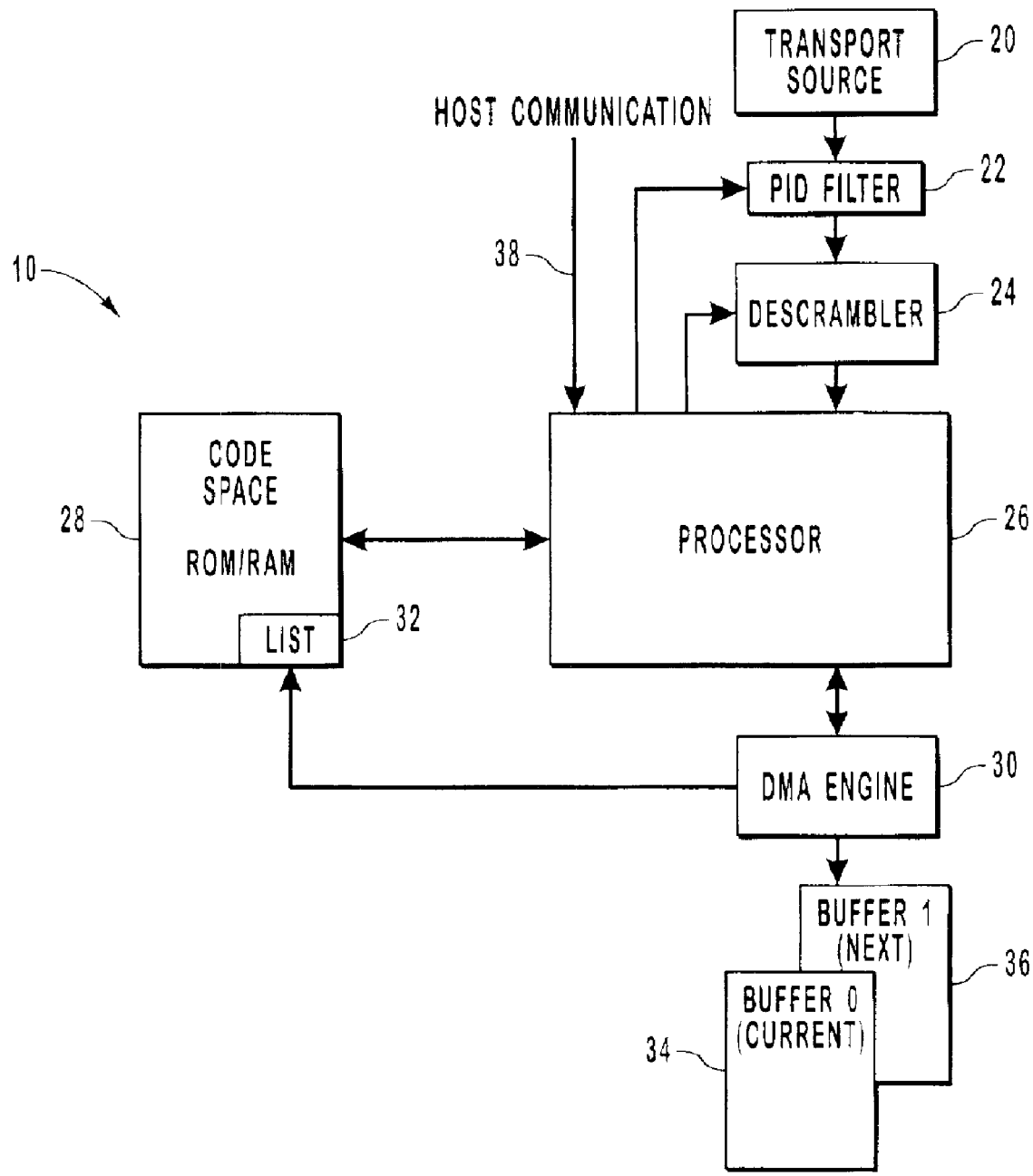
FIG. 1 is a diagram of a conventional transport stream processor.

The present invention is directed to methods and apparatus for managing error/status information generated in a transport stream processor. In the present invention, error/status information is aggregated into an error/status packet having control fields containing error information and packet handling information. Upon completion of packet processing, the error/status packet is transported to bulk system memory rather than being maintained in the memory of the transport stream processor.

By storing error/status information in bulk system memory, cost and processing efficiencies are realized. The potentially large amount of error information that a system processor may require to decode video data associated with processed data packets places a heavy burden on transport stream processor memory. By placing error/status information into a dedicated error/status buffer of the bulk memory, the burden is removed from the transport stream processor memory. Because the bulk memory of the system is generally the most inexpensive type of system memory, the transport stream processor system is less expensive to manufacture. Additionally, because the error information is organized in easily accessible error/status packets and held in one or more dedicated error/status buffers, the present invention facilitates access and utilization of error/status information by the system processor. This functionality is particularly important when the system processor is required to receive and decode multiple video programs. The present invention is also beneficial with the use of fast-forward and rewind functionality associated with many digital video formats in which error/status information related to the location of picture headers must be quickly accessed by the system processor.

The embodiments of the present invention may comprise a special purpose or general purpose computer including various computer hardware. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be implemented in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 2:
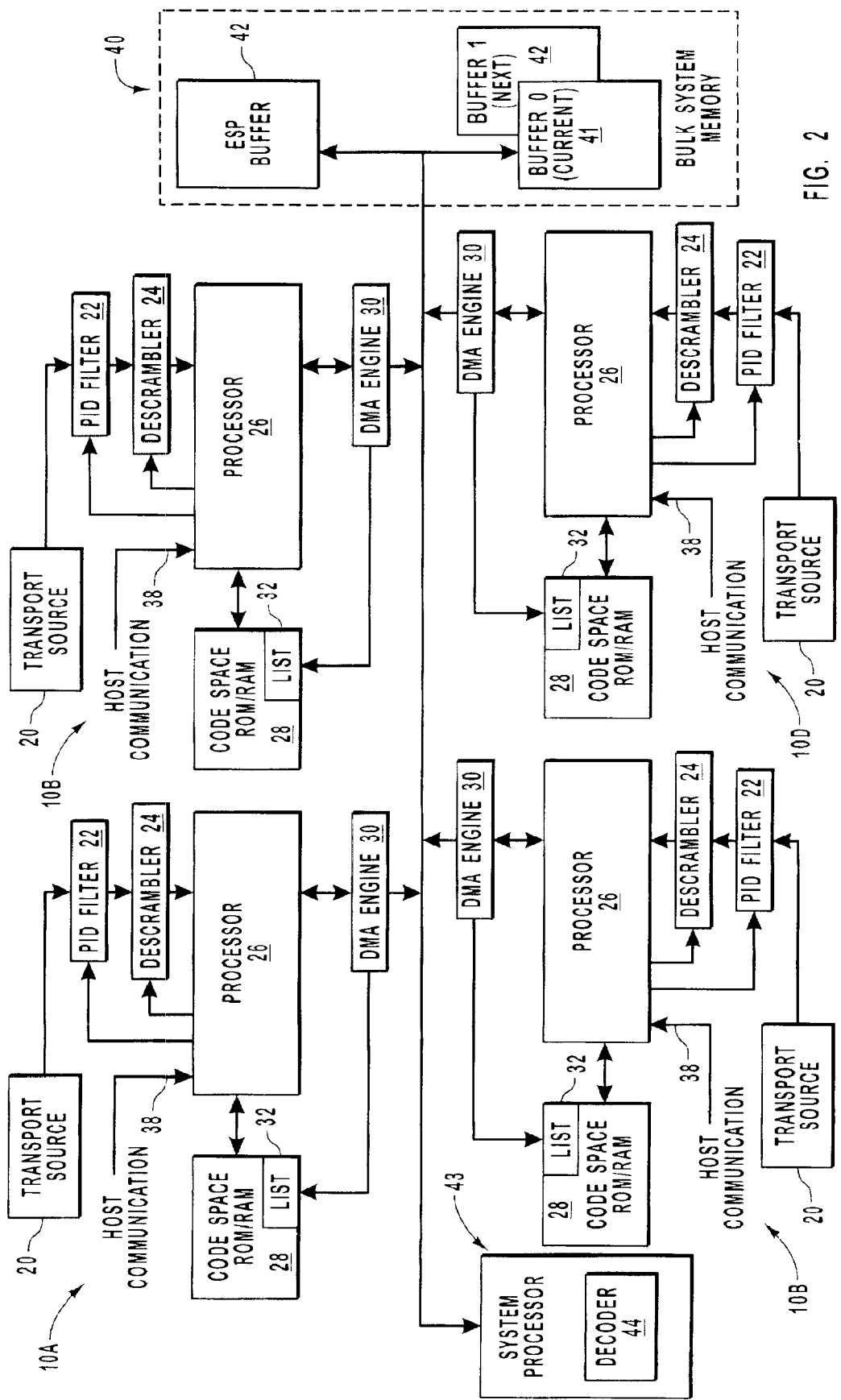
FIG. 2 illustrates a system utilizing multiple transport stream processors in which error/status information is stored in bulk system memory.

With reference now to FIG. 2, there is shown system architecture for implementing error/status information management of the present invention. Included in the system architecture are transport stream processors 10a, b, c, d, bulk system memory 40, and system processor 43. Transport stream processors 10a, b, c, d process data packets from incoming transport streams. Each transport stream processor 10a, b, c, d receives a different incoming video stream. Bulk system memory 40 includes memory space for processed data packets and the associated video data received from transport stream processors 10a, b, c, d, as well as memory space for other system components. System processor 43 is a microprocessor for processing computer-executable instructions and other data structures received by the system.

According to one embodiment of the present invention, system memory 40 includes video stream ring buffer 41 and error/status buffer 42. Video stream ring buffer 41 acts as the repository for data packets that have been processed by transport stream processors 10a, b, c, d. In the one embodiment of the present invention, a separate video stream ring buffer is provided for each transport stream processor.

Error/status buffer 42 is configured to receive error information from transport stream processors 10a, b, c, d. In one embodiment, error/status buffer 42 includes a single bulk memory buffer. Error/status buffer 42 can comprise a ring buffer configured to overwrite previously received data once a given amount of data is received. In an alternative embodiment, error/status buffer 42 includes a plurality of bulk memory buffers. In this embodiment, the bulk memory buffers can include ping-pong buffers configured to be alternatively filled and flushed, resulting in a continuous stream of input and output of error/status information. A variety of buffer types and configurations are possible without departing from the scope and spirit of the present invention.

By placing error/status information in a dedicated buffer in bulk system memory 40, system processor 43 can access information directly from bulk system memory 40 rather than accessing error/status information from transport stream processor memory (code space ROM/RAM) 28. Due to the potentially large quantity of error/status information generated during the processing of data packets, placing error/status information in bulk system memory relieves a substantial burden otherwise placed on system processor 43. The reduced memory requirements on transport stream processor memory 28 makes transport stream processor memory 28 more efficient in operation and less expensive to produce.

System processor 43 reconfigures video data associated with the data packets into digital video programming that can subsequently be displayed on a television or other display device. System processor 43 includes decoder 44, which decodes reconfigured video programming, allowing the user system to display data encoded in a particular digital video format.

System processor 43 obtains video data and reconfigures the video data by: 1) accessing processed data packets from video stream ring buffer 41; 2) obtaining the video data from the data packets; and 3) reconfiguring the video data into video programming. As the system processor accesses and reconfigures video data from the processed data packets contained in the first video stream buffer, system processor 43 simultaneously accesses error/status information from error/status buffer 42. Error/status information enables system processor 43 to properly process access and reconfigure the video data associated with the processed data packets. Such error/status information can relate, for instance, to buffer management, picture header address management, packet acquisition (PID filtering), demultiplex processing, memory handling, continuity counter errors, and program clock reference errors. For example, in a system utilizing ping pong buffers in the place of video stream ring buffer 41, as system processor 43 accesses video data from "current" buffer, the video data from the buffer will quickly be exhausted.

In general, error/status information is generated in response to a condition associated with the data processing that causes an exception or interrupt to be asserted. Thus, error/status information can also be referred to as "exception information" and error/status packets that included the error/status information can be referred to as "exception packets." In general, and unless specified otherwise, such exception information and packets are defined as being associated with conditions that cause either exceptions or interrupts to be asserted, regardless of whether an error has occurred. Examples of error/status information include, buffer management information, picture header address information, packet acquisition information, demultiplexing processing information, memory handling information, continuity counter error information, and program clock reference error information.

System processor 43 then must access video data from the "next" buffer. To determine the location of the next buffer, system processor 43 accesses error/status information related to buffer management from error/status buffer 42. Using the error/status information related to buffer management, the system processor 43 is able to locate the "next" buffer and access video data therefrom. Once the video data has been accessed and configured by system processor 43, decoder 44 decodes the encoded digital video data allowing the video program to be recorded or displayed.

Figure 3:
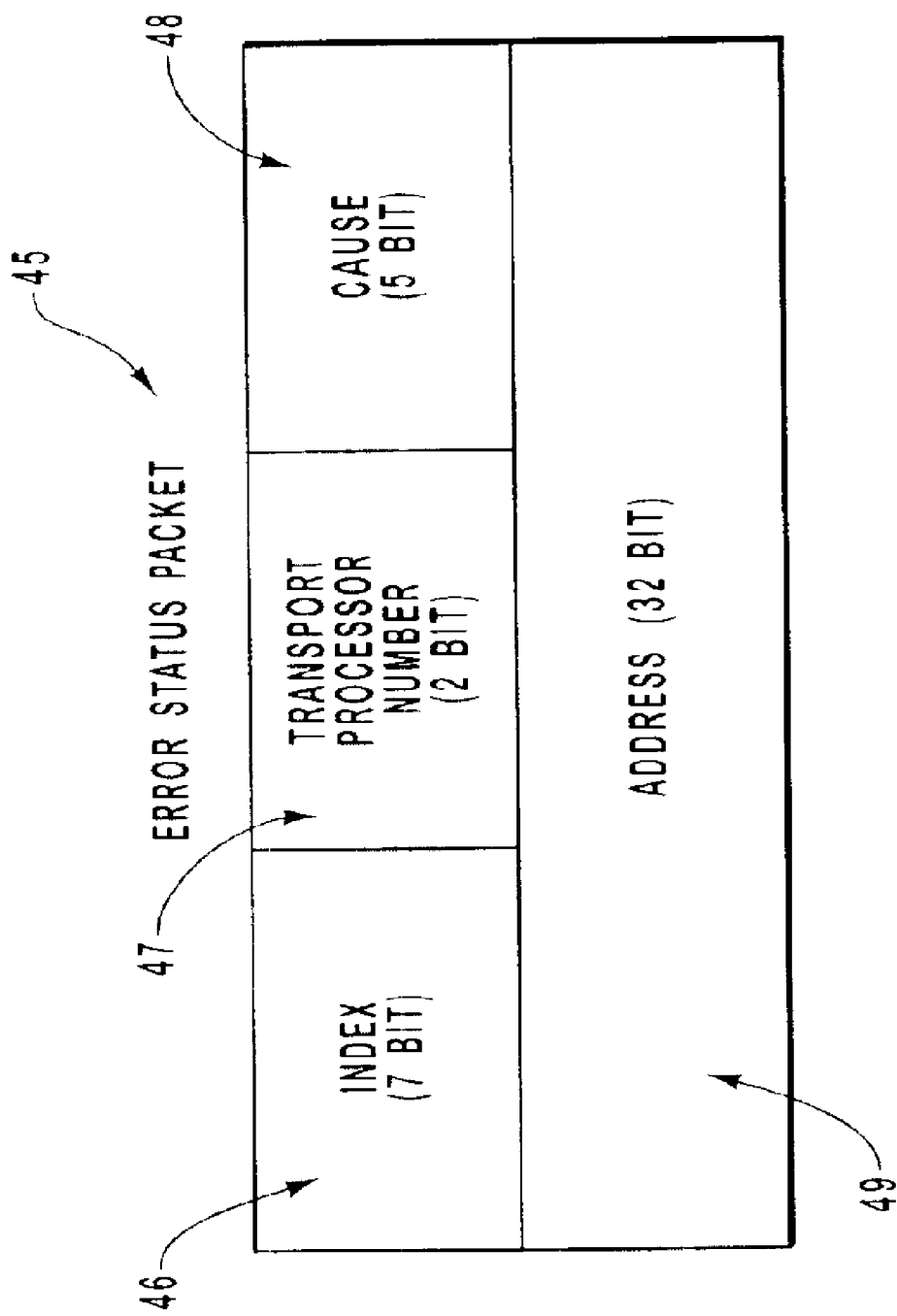
FIG. 3 illustrates an error/status packet including error/status packet control fields.

With reference now to FIG. 3, there is shown an error/status packet 45 illustrating control fields for holding error/status information. According to one aspect of the present invention, management of error information includes arranging error information into error/status packets. Error/status packets and the associated error/status information, once assembled, are transferred to system memory (see error/status buffer 42 of FIG. 2). Error/status packet 45 includes control fields 46, 47, 48, 49 to facilitate the accessibility of error/status information by the system processor.

Control field 46 is an index control field having a seven-bit index for indicating the packet type with which the error/status packet is associated. The seven-bit indices of the index control field have a one-to-one correlation with the packet identifiers associated data packets of a transport stream. One benefit of utilizing the seven-bit index is that the packet identifiers are typically at least 13 bits in length. Thus, the index allows the data packet type to be identified more efficiently. This is particularly important due to the fact that packets of a given type are typically stored in a dedicated video stream buffer. Video data packets are stored in video buffers; audio buffers are stored in audio buffers, etc.

Control field 47 is a transport processor number control field. Transport processor number control field 47 is utilized in systems in which multiple transport processor units are used to process multiple video programs. Thus, the system processor may quickly and efficiently identify error/status packets associated with a given video program processed by one of the transport processor units. This also allows the system processor to determine which of the plurality of transport processor units generated the associated error/status information.

Control field 48 is a cause control field. Cause control field 48 indicates the cause of the condition for which the error/status information was generated. Examples of causes for which error/status information is generated include buffer management, picture header address information, packet acquisition information, error information, demultiplexing processing error information, a continuity counter error indicating a missed data packet, or a program clock reference error. System processor 20 utilizes cause control field 48 and the associated cause related information in the processing of data packets. By accessing error/status packets associated with a processed data packet, the system processor can quickly and efficiently determine whether an error or status condition was identified in the acquisition, processing, or memory handling of a given data packet. Cause control field 48 informs the system processor of the nature of the error/status information. The system processor can then compensate for the error condition or allow for specialized handling of the processed data packets utilizing the status information.

Control field 49 is an address control field. Address control field 49 holds the address information for locating processed data packets in system memory. By providing the address information for locating the processed data packets and the associated video data, the system processor can locate video data associated with error information by accessing the address information of the error/status packet. For example, the fast-forward and rewind functionality provided by many digital video formats, such as MPEG 2, requires that the system processor quickly and efficiently determine the location of picture headers. During the processing of digital video data encoded in the MPEG 2 format, the transport stream processor generates error/status information for all packets containing picture headers. The error/status packets relating to picture headers may be quickly and efficiently accessed by the system processor to determine the address of the picture headers in bulk system memory. Utilizing the address information from control field 49, the system processor can also generate a table of picture headers. With the picture header table, the system processor may quickly and efficiently access the picture headers when the fast-forward and rewind functionalities of a system supporting MPEG 2 are to be used on the video data.

In an alternative embodiment, the error/status packet includes multiple cause control fields for including all error/status conditions associated with a given packet. In this embodiment, all error information associated with the acquisition, processing, memory handling, or any other error condition is accumulated into a single error/status packet that is then sent to an error/status buffer. In this embodiment, the number of cause control fields is dictated by the number of error conditions generated in the handling of the data packet.

Control fields 46, 47, 48, 49 are illustrative of control fields that may be utilized in generating error/status packets. A variety of control field types may be arranged in variety of configurations without departing from the spirit or scope of the present invention. For example, when a transport stream processor fails to acquire or properly process a data packet, a continuity counter error is generated. Error/status packets relating to continuity counter errors do not need address information because the system processor does not need to access a data packet when utilizing continuity counter error information. Accordingly, any error/status packets relating to continuity counter errors either do not have an address control field or, if they do have an address control field, the field has a null value or another value that is not used in subsequent processing.

Figure 4:
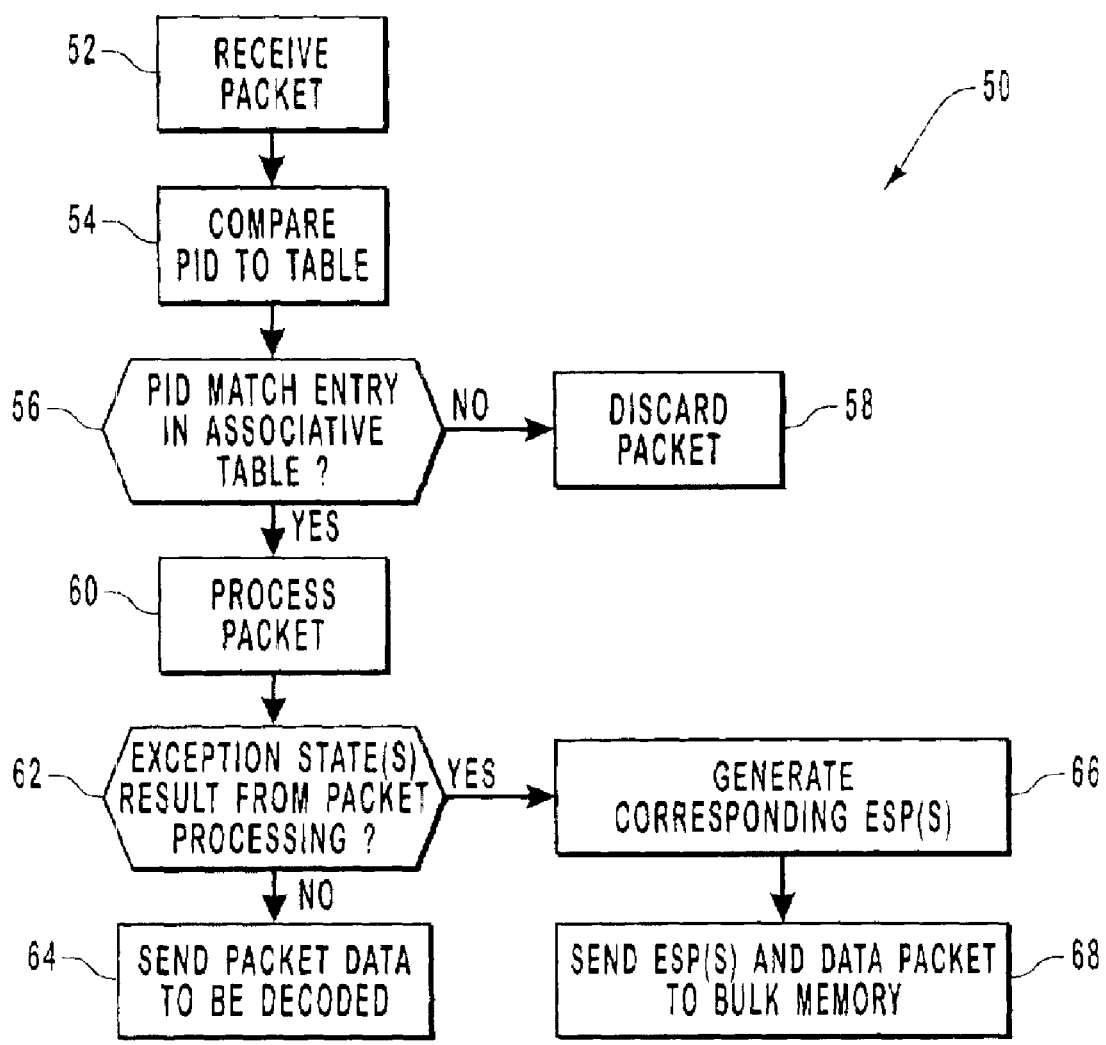
FIG. 4 is a flow chart illustrating one embodiment of a logic operation used to generate an error/status packet.

With reference now to FIG. 4, there is shown a method 50 for managing error/status information according to one aspect of the present invention. In the method, a packet is received in a first step 52. Once the packet is received, the step 54 of comparing the packet identifier to the associative table is conducted. If, according to decision block 56, the packet identifier does not match the entry in the associative table, the packet is discarded in step 58. If the packet identifier matches an entry in the associative table, the packet is processed according to step 60.

Once the packet is processed, the method proceeds to decision block 62 in which it is determined whether one or more exception states have resulted from the packet processing. If an exception state has not resulted from the packet processing, the data packet is decoded in step 64. If, however, one or more exception states have resulted from the processing of the packet, one or more corresponding error/status packets are generated in step 66. Once the one or more error/status packets have been generated, the processed data packet and the error/status packets are sent to system memory in step 68.

Figure 5:
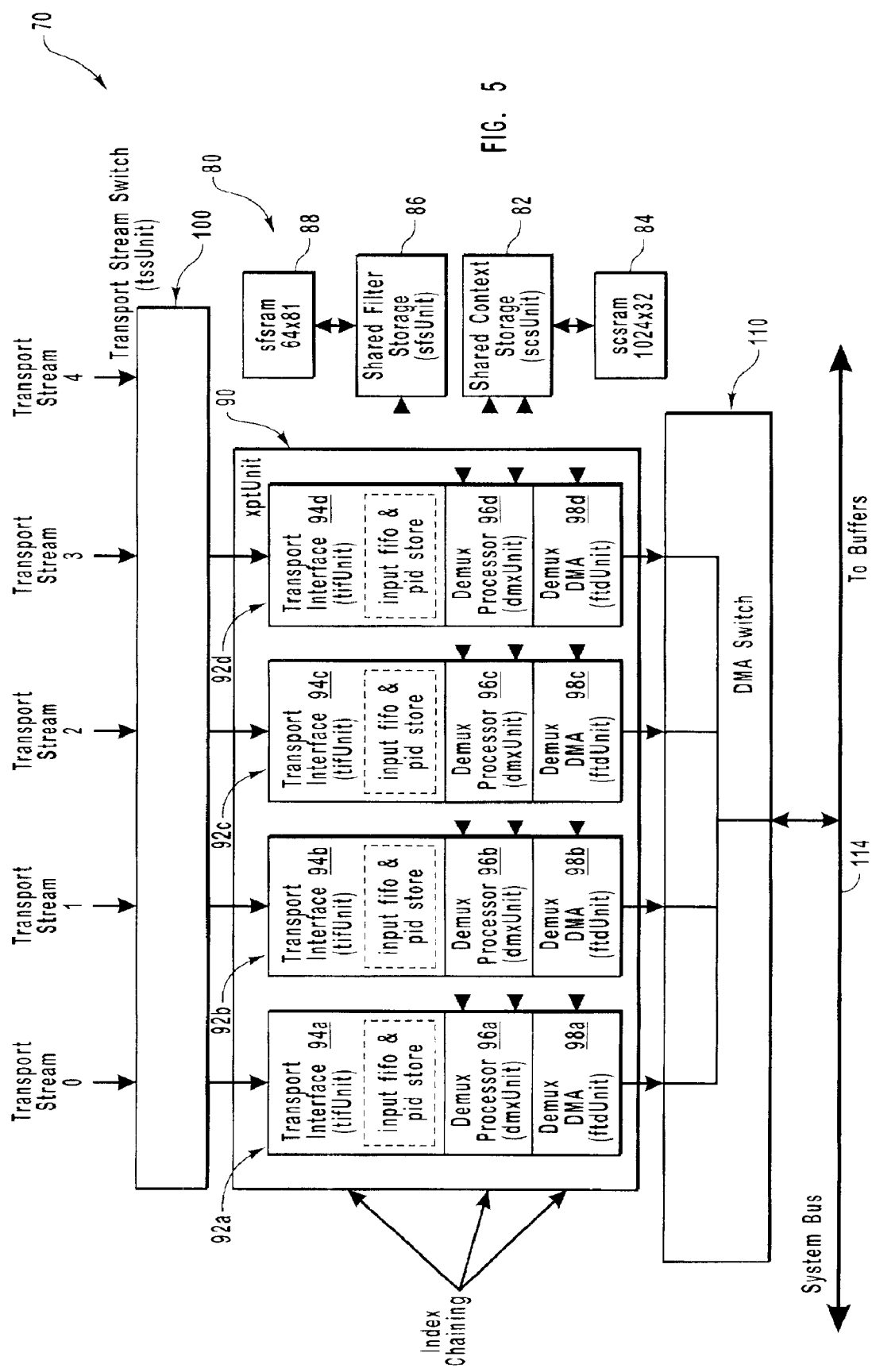
FIG. 5 is a schematic diagram of a processing apparatus for receiving, processing, and transporting incoming digital video packets for one or more digital video transport streams in which error/status packets are generated.

With reference now to FIG. 5, there is shown a processing apparatus 70 that is particularly well suited for use with the present invention. Processing apparatus 70 includes a transport processor memory unit 80, a transport processing circuit 90, a transport stream switch 100, and a DMA switch 110. Processing apparatus 70 is configured to process multiple video programs from one of more incoming transport streams. The transport processing memory unit 80 is used by the transport processing circuit in the processing of incoming video transport streams. A transport stream switch 100 arbitrates which of the incoming video transport streams is to be fed to the transport processing circuit 90. The DMA switch 110 arbitrates which of the outgoing data packets will be transported over system bus 114.

Transport processor memory unit 80 includes a shared context storage 82, a shared context storage ram 84, a shared filter storage 86, and a shared filter storage ram 88. Shared context storage is used to access shared context entries from shared context storage ram 84. Shared context entries contain processing instructions and the hardware state for data packet types to be processed. Shared filter storage 86 is used to access shared filters for processing data packet payloads of acquired data packets.

Transport processing circuit 90 includes a first transport processor unit 92*a*, a second transport processor unit 92*b*, a third transport processor unit 92*c*, and a fourth transport processor unit 92*d*. Each transport processor units 92*a–d* processes a distinct video program from one or more incoming video transport streams. During the demultiplexing and processing of the incoming video transport streams, the transport processor units 92*a–d* utilize the transport processor memory unit 80. By utilizing a common transport processor memory unit, transport processing circuit 90 is able to efficiently process the incoming video transport stream.

Each of the transport processor units 92*a*, 92*b*, 92*c*, 92*d* includes a transport interface 94, demultiplexing processor 96, and a demultiplexing DMA unit 98 (herein as a "demultiplexing DMA"). For example, first transport processor unit 92*a* includes transport interface 94*a*, demultiplexing processor 96*a*, and demultiplexing DMA 98*a*. Transport interfaces 94*a–d* identifies which data packets are to be acquired from the incoming video transport stream. Demultiplexing processors 96*a–d* utilize the shared context storage 82 and the shared filter storage 86 to process the acquired data packets. Demultiplexing DMAs 98*a–d* determine where acquired data packets are to be stored. The demultiplexing DMA's include a data packet buffer for holding processed data packets and an error/status packet buffer for holding the error/status packets until they can be sent to system memory. Further details of the architecture and operation of transport processing circuit 90 of FIG. 5 are disclosed in U.S. patent application Ser. No. 10/094,048, which is entitled "Transport Processor for Processing Multiple Transport Streams," was filed on the same day as this application, and is incorporated herein by reference.

Error information can be generated in the acquisition of data packets in the transport interface, the processing of data packets in the demultiplexing processor, or the memory handling of data packets in the demultiplexing DMA. The error information is then arranged into the control fields of the error/status packets. The error/status packets are sent using a DMA operation to error/status buffers in system memory. The error/status packets can then be quickly and efficiently accessed by the system processor during the reconfiguration and decoding of the digital video program.

Using error/status packets to manage error/status information and the storing of the error/status packets in bulk system memory, according to the present invention, are particularly well suited for use with processing apparatus 70. Because processing apparatus 70 is primarily a hardware implementation, in the absence of error/status packets and storage of error/status packets in bulk system memory, error/status information must otherwise be stored in hardware registers contained in the transport processor units. The total number of registers that would be needed for each transport processor unit is a function of the number of different types of information that must be gleaned from the transport stream. Thus, the memory required to hold the error/status information for each transport processor unit generally cannot be met practically by hardware registers. To meet the memory requirements of the transport processor units, each processor unit would have to employ RAM memory. The use of RAM memory for each transport processor unit would frustrate the design benefits realized by processing apparatus 70.

An additional problem encountered by using hardware registers in the absence of the error/status packets of the invention and the storage of such error/status packets in the bulk system memory relates to conflicts encountered in the accessing of error information. The conflicts encountered in storing and accessing error information in the large number of hardware registers needed would be intractable. This is particularly true in the case of the fast-forward and rewind functionally provided by many digital video formats. The amount of time required to locate the position of picture headers in the hardware registers and the management of processed packet data are greatly facilitated by using error/status packets to manage error/status information.

The use of error/status packets allows the transport processing circuit to bundle all error/status information generated in the handling of the data packets and store the error/status information in bulk system memory using direct memory access. Thus, the transport processor units do not need dedicated RAM memory or hardware registers to hold error/status information according to the invention, which makes the transport processing circuit less expensive to manufacture. An additional benefit of storing error/status packets in dedicated error/status buffers in bulk system memory is that the system processor can access error/status related information quickly and efficiently. In one embodiment of the present invention, discrete error/status buffers are dedicated to hold error/status information for individual video programs. This allows the system to quickly and efficiently identify where error/status information for a particular video program is stored.

Figure 6:
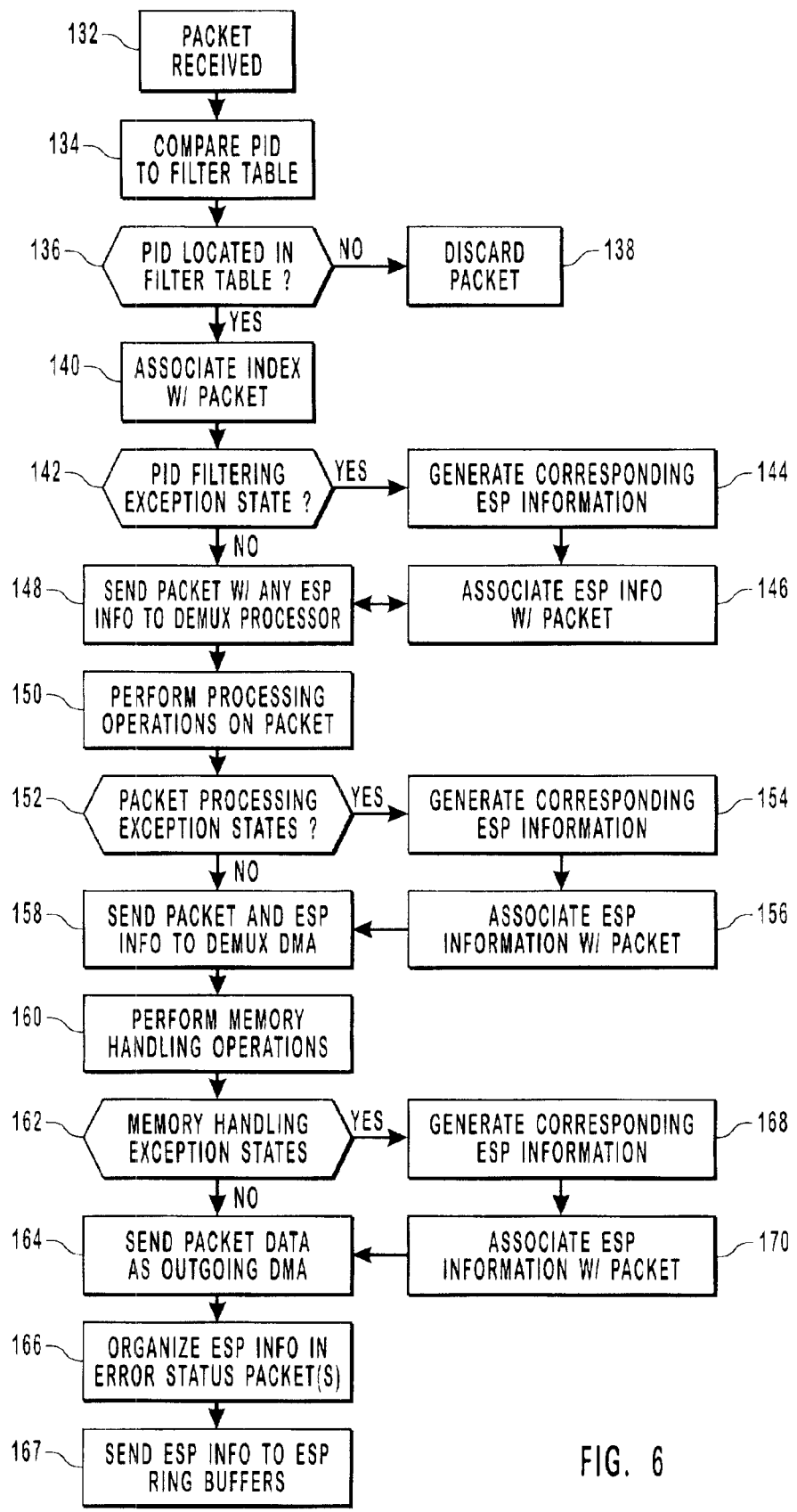
FIG. 6 is a flow chart of one embodiment of the present invention illustrating logic operations for generating error/status packets in a processing apparatus for processing multiple digital video programs.

With reference now to FIG. 6, there is shown a method of generating error/status packets in a processing apparatus for processing multiple video programs. According to this method, a data packet is received in step 132. Once the packet has been received, the packet identifier is compared with the filter table according to step 134. If, according to decision block 136, the packet identifier is not located in the filter table, the data packet is discarded in step 138.

In, however, the packet identifier is located in the filter table, an index is associated with the data packet in step 140. Once an index has been associated with the packet, the method proceeds to decision block 142, in which it is determined whether an exception state associated with packet filtering exists. In the event of that the exception state does exist, step 144 is conducted, in which corresponding error/status packet information is generated, followed by step 146, in which the error/status packet information is associated with the data packet. The data packet with the error/status packet information is then sent to the demultiplexing processor in step 148.

Returning now to decision block 142, if no exception state exists, the method advances to step 148, in which the data packet is sent to the demultiplexing processor without error/status packet information. Once the packet and any associated error/status packet information have been sent to the demultiplexing processor, demultiplex processing operations are performed on the packet according to step 150. The method then proceeds to decision block 152, in which it is determined whether an exception state related to packet processing exists. If a packet processing exception state does exist, corresponding error/status packet information is generated in step 154. The error/status packet information is then associated with the data packet in step 156 and the data packet and the error/status packet information are sent to the demultiplexing DMA in step 158.

In the event that no packet processing exception states exist according to decision block 152, the data packet is sent to the demultiplexing DMA without error/status packet information in step 158. Once the packet and any associated error/status packet information have been sent to the demultiplexing DMA, memory handling operations are performed in step 160. If, according to decision block 162, no exception states related to memory handling exist, the processed packet data is sent to memory as outgoing DMA in step 164. In the event that memory handling exception states do occur, step 168 is executed, in which corresponding error/status packets information is generated. The error/status packet information is then associated with the data packet in step 170, followed by the execution of step 164.

Once the processed data packet has been sent to memory as outgoing DMA the error/status information, if any exists, is organized into control fields of one or more error/status packets in step 166 and the error/status packet is sent to the error/status packet buffer in step 167. In the preferred embodiment, each error or status condition is bundled in a unique error/status packet.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a video processing device configured to receive an incoming video stream, the video processing device having a transport processor unit for processing data packets from the incoming video stream and a memory, a method for handling exception information comprising the acts of:

accumulating exception information generated as a data packet is processed by the transport processor unit;

creating an exception packet within the transport processor unit by arranging the exception information into one or more control fields of the exception packet; and transferring the exception packet created within the transport processor unit to system memory, rather than storing the exception packet within the memory of the transport processor unit, for subsequent access by video processing software being executed by a system processor.

2. A method as recited in claim 1, wherein the act of creating the exception packet comprises the acts of:

inserting a first exception condition into a control field of a first exception packet; and inserting a second exception condition into a control field of a second exception packet.

3. A method as recited in claim 1 wherein the act of creating an exception packet comprises:
   inserting a first exception condition into a first control field of the exception packet; and
   inserting a second exception condition into a second control field of the exception packet.

4. A method as recited in claim 1 wherein one of the control fields of the exception packet comprises a field for indicating the cause of the exception condition for which the error information was generated.

5. A method as recited in claim 1 wherein one of the control fields of the exception packet comprises a field for holding memory address information for locating the data packet.

6. A method as recited in claim 1 wherein one of the control fields of the exception packet comprises a field for holding index information for indicating the type of packet with which the exception packet is associated.

7. A method as recited in claim 1 wherein one of the control fields of the exception packet comprises transport processor number control field.

8. A method as recited in claim 1 wherein the video processing device has only a single transport processor unit.

9. A method as recited in claim 1 wherein the video processing device has a plurality of transport processor units.

10. A method as recited in claim 7 wherein the transport processor number control field comprises a transport processor number for determining which of a plurality of transport processor units generated the exception information.

11. In a video processing device configured to receive an incoming video stream, the video processing device having a plurality of transport processor units, each transport processor unit having a transport interface, a demultiplexing processor, memory, and a demultiplexing direct memory access (DMA) unit, each transport processor unit being configured to process data packets from the incoming video stream, a method for handling error information comprising the acts of:
   accumulating exception information generated in the transport interface of one or more of the plurality of transport processor units as data packets are acquired from the video stream;
   accumulating exception information generated in the demultiplexing processor of the one or more transport processor units as the acquired data packets are processed;
   accumulating exception information generated in the demultiplexing DMA unit of the one or more transport processor units as the acquired data packets undergo memory handling;
   creating one or more exception packets within the one or more transport processor units by arranging the exception information into one or more control fields of the one or more exception packets; and
   transferring the one or more exception packets created within the one or more transport processor units to system memory accessible by video processing software being executed by a system processor, rather than storing the one or more exception packets within the memory of the one or more transport processor units, for subsequent access by the video processing software being executed by the system processor.

12. A method as recited in claim 11 wherein the exception information comprises information related to packet acquisition.

13. A method as recited in claim 11 wherein the exception information comprises information related to packet processing.

14. A method as recited in claim 11 wherein the exception information comprises information related to packet memory handling.

15. A method as recited in claim 11 wherein the exception information comprises information related to an error condition.

16. A method as recited in claim 11 wherein the exception information comprises buffer control information.

17. A method as recited in claim 11 wherein the exception information comprises interrupt information.

18. A method as recited in claim 11 wherein the exception information enables the system to create a table of picture headers.

19. For use in a video processing device configured to receive an incoming video stream, the video processing device having a transport processor unit for processing data packets from the incoming video stream and a memory, a computer-readable medium carrying computer-executable instructions for implementing a method for handling exception information, wherein the computer-executable instructions comprise:
   program code means for receiving exception information generated as a data packet is processed by the transport processor unit;
   program code means for creating an exception packet within the transport processor unit by arranging the exception information into one or more control fields of the exception packet; and
   program code means for transferring the exception packet created within the transport processor unit to system memory, rather than storing the exception packet within the memory of the transport processor unit, for subsequent access by video processing software being executed by a system processor.

20. In a video processing device configured to decode video data associated with processed data packets, the video data representing a video programming, a method for utilizing information held in exception packets generated in a transport processor unit comprising the acts of:
   accessing video data associated with processed data packets from a video stream buffer in system memory;
   accessing information held in exception packets from system memory, as opposed to memory within the transport processor unit where the exception packets were created; and
   utilizing information held in exception packets stored within the system memory to inform operations associated with configuring and decoding of the video data by video processing software being executed by a system processor.

21. The method as disclosed in claim 20 wherein the exception packets comprise control fields for informing operations associated with the configuring and decoding of video data.

22. The method as disclosed in claim 21 wherein one of the control fields comprises a cause control field for indicating the cause of the error condition detected during the processing of a data packet.

23. The method as disclosed in claim 21 wherein one of the control fields comprises an address control field for locating a processed data packet and the associated video data in system memory.

24. The method as disclosed in claim 21 wherein one of the control fields comprises a index control field having an index corresponding to the packet identifier of the processed data packet.

25. The method as disclosed in claim 21 wherein one of the control fields comprised a transport processor number control field for identifying the transport processor unit which processed the data packet.

26. The method as disclosed in claim 20 wherein the system memory comprises bulk system memory.

27. The method as disclosed in claim 20 wherein exception packets are held in exception packet buffers in the system memory.

28. The method as disclosed in claim 27 wherein the exception packet buffer comprises a ring buffer.

29. The method as disclosed in claim 27 wherein the exception packet buffer comprises a ping-pong buffer.

30. In a video processing device configured to decode video data representing a digital video program, the transport data being acquired from a video transport stream in a transport processor unit having a memory, a method for creating and using exception packet information generated in the transport processor unit comprising the acts of:

accumulating exception information generated as transport data is acquired by the transport processor unit;

creating an exception packet within the transport processor unit by arranging the exception information into one or more control fields;

transferring the exception packet created within the transport processor unit to an exception packet buffer within system memory, rather than storing the exception packet within the memory of the transport processor unit;

accessing the exception packet from the exception packet buffer; and utilizing exception information held in the exception packet to inform operations associated with the decoding of video data by video processing software being executed by a system processor.

31. The method disclosed in claim 30 wherein the act of transferring the one or more exception packets comprises the act of transferring the one or more exception packets in a direct memory access operation.

32. A video processing device configured to process data packets received from an incoming video stream and wherein exception information is generated in the processing of one or more data packets, the processing apparatus comprising:

a plurality of transport processor units, wherein each of the transport processor units comprises:
      a memory;
      a transport interface that identifies data packets to acquire from an incoming video stream and generates exception information related to packet acquisition;
      a demultiplexing processor that performs processing of the acquitted data packets and generates exception information related to data packet processing;
      a demultiplexing direct memory access (DMA) unit that determines memory handling operations to be performed on the acquired data packets and generates exception information related to data packet memory handling; and
   means for organizing the exception information into one or more control fields of one or more exception packets that are transferred to system memory by the DMA unit, rather than being stored within the memory of the transport processor unit, for subsequent access by video processing software being executed by a system processor.

* * * * *

UNITED STATES PATENT AND TRADEMARK OFFICE
CERTIFICATE OF CORRECTION

| | | |
|---|---|---|
| PATENT NO. | : 6,983,408 B2 | Page 1 of 1 |
| APPLICATION NO. | : 10/093646 | |
| DATED | : January 3, 2006 | |
| INVENTOR(S) | : Coffin, III et al. | |

It is certified that error appears in the above-identified patent and that said Letters Patent is hereby corrected as shown below:

In column 6, line 57, after "buffer" insert -- 41 --.

In column 15, line 2, in Claim 25, delete "comprised" and insert -- comprises --, therefor.

Signed and Sealed this

Twenty-eighth Day of July, 2009

JOHN DOLL
*Acting Director of the United States Patent and Trademark Office*